INVENTORS
CHARLES N. McKINNEY,
HAROLD F. SMITH &
WILLIAM K. POLLARD

ATTORNEY

3,409,769
X-RAY SPECTROMETER SAMPLE CELL HAVING AN ADJUSTABLE SECONDARY X-RADIATION RADIATOR AND TAUT X-RAY TRANSPARENT WINDOW

Charles N. McKinney, Ponca City, Okla., Harold F. Smith, Arkansas City, Kans., and William K. Pollard, Ponca City, Okla., assignors to Continental Oil Company, Ponca City, Okla., a corporation of Delaware
Filed July 26, 1965, Ser. No. 474,660
5 Claims. (Cl. 250—51.5)

ABSTRACT OF THE DISCLOSURE

A sample cell for an X-ray spectrometer, said cell having a chamber containing a secondary X-radiation radiator adjustably mounted at a plurality of points in said chamber and with a cell window stretched tautly across said chamber so as to provide a constant thickness of sample disposed between said cell window and said secondary X-radiation radiator.

---

This invention relates to spectrochemical analysis using X-rays. More particularly, the invention relates to an improved sample cell for use in X-ray spectroscopy and to an analytical technique using the sample cell, by which technique, an analysis of liquid samples for elements having atomic numbers exceeding 3 may be conducted.

X-ray fluorescent spectroscopy has become a powerful analytical tool, though it has heretofore been limited in its applicability to the analysis of elements having an atomic number of 12 and above. This limitation makes impossible the analysis of such commonly occurring elements as carbon, fluorine, oxygen and sodium. X-ray absorption spectroscopy, on the other hand, though having an advantage with respect to X-ray fluorescent spectroscopy of permitting the linear Beer's Law relationship between concentration and absorbed radiation to be used in the analysis, is not as sensitive as the fluorescence technique for the determination of elements, such as sulfur, having an atomic number greater than 12.

The present invention provides an improved X-ray spectro-chemical analytical procedure utilizing a novel sample cell for containing a liquid sample which is to be subjected to analysis. The cell can be utilized without modification in commercial X-ray spectrometers which are now commercially available and facilitates the analysis of liquids, such as hydrocarbons and water, for the concentration therein of carbon, oxygen, sodium and other elements having an atomic number of at least 4. The construction of the cell reduces matrix effects and permits both absorption and fluorescent measurements to be made on the same sample without removing the cell from the spectrometer.

Broadly described, the sample cell of the invention comprises a housing dimensioned to be received in an X-ray spectrometer in alignment with X-radiation from a primary source, the housing having a hollow chamber formed therein for the accommodation of a liquid sample; a metallic member functioning as a secondary radiator of X-radiation positioned in the hollow chamber and having a substantially monoplanar surface exposed to impingement by X-radiation from the primary source; a window transparent to a predominant amount of the X-radiation originating at said primary source and absorbing a constant amount of the radiation from said source under a fixed set of instrumental conditions, said window extending across the hollow chamber in the housing and parallel to the monoplanar surface of the metallic member and spaced therefrom; and means adjustably mounting the metallic member to the housing for varying the distance between the metallic member and the window whereby the thickness of a liquid sample confined between the window and the metallic member may be varied by adjustment of the position of the metallic member.

In specific embodiments of the invention, the metallic housings of the sample cells are configured to fit in the types of X-ray spectrometers now prevalently in use. These instruments include a primary source of X-radiation; means for detecting and measuring the intensity of X-radiation quantum emanating from a sample either in the course of fluorescence or absorption spectroscopy; and a suitable means for selecting radiation of a particular wavelength and transmitting such radiation to the detecting and measuring means. Most frequently, the wavelength selection means comprises a suitable analyzing crystal which intercepts polychromatic radiation originating with, or passed through, the sample, and which diffracts a monochromatic portion of such intercepted radiation having a specific wavelength at an angle such that the diffracted radiation is detected and measured by the equipment provided for this purpose.

In utilizing the sample cell in practicing the improved analytical technique of the invention, a liquid sample is positioned in the hollow chamber and fills the space existing between the metallic secondary radiator and the window of the cell. X-rays from the primary source, which normally constitutes a conventional X-ray tube, are then directed through the window and the liquid sample and against the metallic secondary radiator. The impingement of the primary X-rays on the metallic secondary radiator causes the radiator to emit characteristic fluorescent X-radiation which passes through the liquid sample and window. A portion of the characteristic fluorescent radiation from the metallic secondary radiator is absorbed in the liquid sample, such absorption being related to the concentration of particular elements present in the liquid sample. The characteristic fluorescent radiation is then intercepted by the wavelength selection device, and in accordance with well-known X-ray spectroscopy phenomena, is diffracted at various angles according to the wavelengths present in such characteristic fluorescent radiation. By aligning a suitable detecting and measuring instrument with the diffracting crystal at the particular angle at which radiation of a selected wavelength is diffracted, the intensity of a particular monochromatic X-radiation which is transmitted through the liquid sample can be measured, and from such measurement, the concentration of the various elements in the liquid sample can be determined.

In addition to facilitating measurement of the intensity of the attenuated characteristic fluorescent X-radiation from the secondary radiator after it is passed through the liquid sample, the sample cell permits direct fluorescence measurements to be made of the fluorescent X-radiation from the liquid sample as a result of direct impingement thereon of the primary X-rays. This can be quickly accomplished by merely changing the angle of the analyzing crystal so that the radiation which is diffracted to the detecting and measuring instrument is radiation developed by fluorescence of the liquid sample rather than the attenuated radiation from the secondary radiator.

The adjustability of the metallic secondary radiator with respect to the cell window is an important feature of the invention. This adjustability permits selective variation of the thickness of the liquid sample traversed by the characteristic fluorescent X-radiation from the secondary radiator. In this way, the cell and sample can be easily accommodated to a particular detector so as to yield an output radiation beam having an intensity which admits of the most accurate measurement attainable with the detector.

From the foregoing brief description of the invention, it will have become apparent that it is an important object of the present invention to provide an improved sample cell for use in X-ray spectroscopy.

An additional object of the invention is to provide a new X-ray spectroscopy technique which permits the analysis of liquid samples for elements having an atomic number of at least 4.

A further object of the invention is to provide a sample cell which permits both fluorescence and absorption X-ray measurements to be made on a liquid sample without the necessity to remove the cell or sample from the spectrometer.

Another object of the invention is to provide a sample cell for use in X-ray spectroscopy which permits undesirable matrix effects usually encountered in conventional X-ray spectroscopy to be mitigated.

Another object of the invention is to provide a compact sample cell which can be used in most commercially available X-ray spectrometers without modification, and which is interchangeable with the conventional cells now used in such instruments for fluoroescence analysis.

Yet another object of the invention is to provide an X-ray spectrochemical analysis sample cell incorporating an easily manipulated means of varying the path length of the X-rays through a liquid sample contained in the cell whereby the intensity of the output or attenuated radiation can be varied in accordance with the requirements of a particular X-ray detection and measuring apparatus.

In addition to the foregoing objects and advantages of the invention, other objects will become apparent as the following detailed description of the invention is read in conjunction with a persual of the accompanying drawings which illustrate certain exemplary embodiments of the invention and the manner in which it may be practiced.

In the drawings:

FIGURE 5 is a perspective view of a modified sample cell constructed in accordance with the present invention, and adapted for use in a different type of widely used X-ray spectrometer than the type of instrument in which the cell depicted in FIGURES 2–4 is utilized.

FIGURE 6 is an exploded view of the sample cell illustrated in FIGURE 5.

Figure 1:
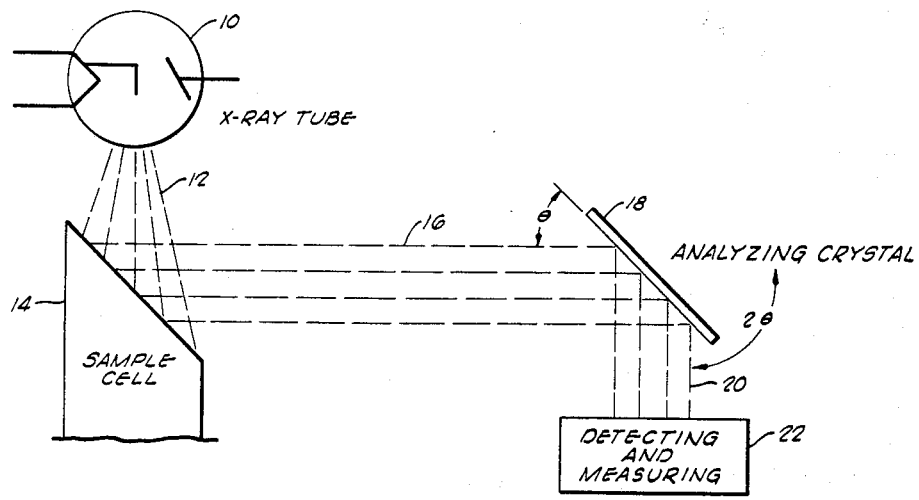
FIGURE 1 is a schematic illustration of the basic arrangement of the apparatus components conventionally used in fluorescent X-ray spectroscopy.

Before commencing a description of the details of construction of the sample cell of the present invention, and of the manner in which it is utilized, brief reference will be made to FIGURE 1 which illustrates a typical arrangement of the basic components conventionally employed in fluorescent X-ray spectroscopy for analyzing a sample. A suitable primary X-ray tube 10 provides a source of primary X-radiation 12. The wavelength of the radiation yielded can be controlled by control of the power to the X-ray tube and the materials of construction used therein. Primary X-radiation 12 from the X-ray tube 10 impinges upon a sample contained in a sample cell 14, and as a result of such impingement, the sample fluoresces or radiates its own characteristic X-radiation 16 which is of a particular wavelength or wavelengths, dependent upon the element or elements present in the sample. The relationship between the wavelength, $\lambda$, of the characteristic fluorescent X-radiation 16 from the sample, and the atomic number of the elements, Z, present in the sample is given by $$1/\lambda \alpha Z^2 \qquad (1)$$

The characteristic fluorescent radiation from the sample radiates outwardly from the sample cell 14 and is intercepted by a device capable of distinguishing and separating the various wavelengths of impinging radiation one from the other. In the typical arrangement illustrated in FIGURE 1, selection or distinction of wavelengths is accomplished by the use of an analyzing crystal 18 which accomplishes the desired selection by diffracting radiation having the specific wavelengths which are characteristic of the fluorescent X-radiation from particular elements in the sample. The diffracted X-radiation is intercepted by a detecting and measuring system 22. The diffracted radiation emerges at an angle $2\theta$ with respect to the plane of the incident beam and is measured by the detector. If it is desired to measure the whole spectrum from the specimen, the crystal is turned through an angle of 90°, and the detector is turned at twice the speed of the crystal so that it will always be in a position to intercept the diffracted radiation. The wavelengths of the diffracted radiation which is picked up by the detector determine the elements present in the specimen, and the intensity of each line as determined by some type of counter in the detection and measuring system is related to the percentage composition of that element.

Figure 2:
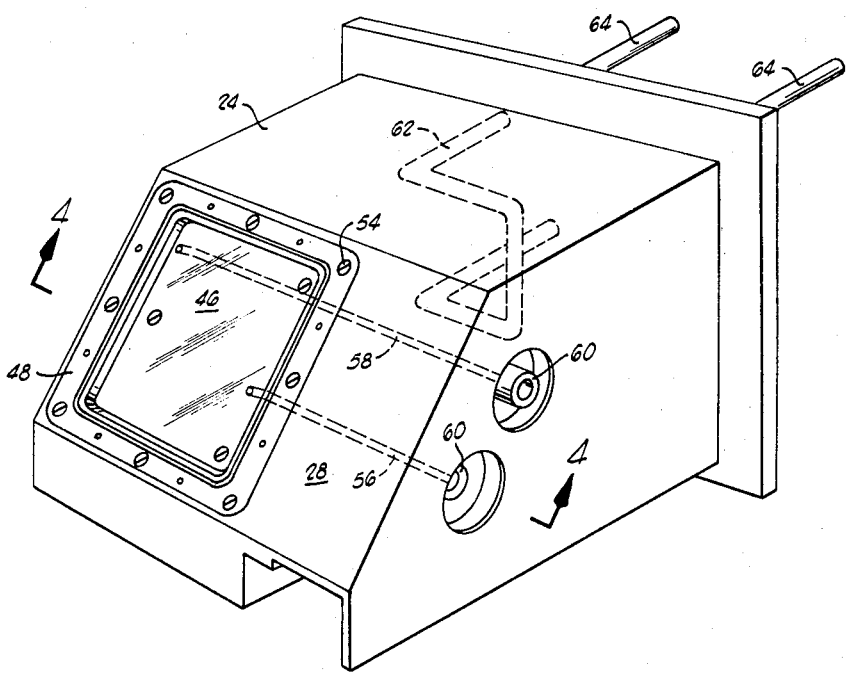
FIGURE 2 is a perspective view of one embodiment of the novel sample cell of the present invention.
Figure 4:
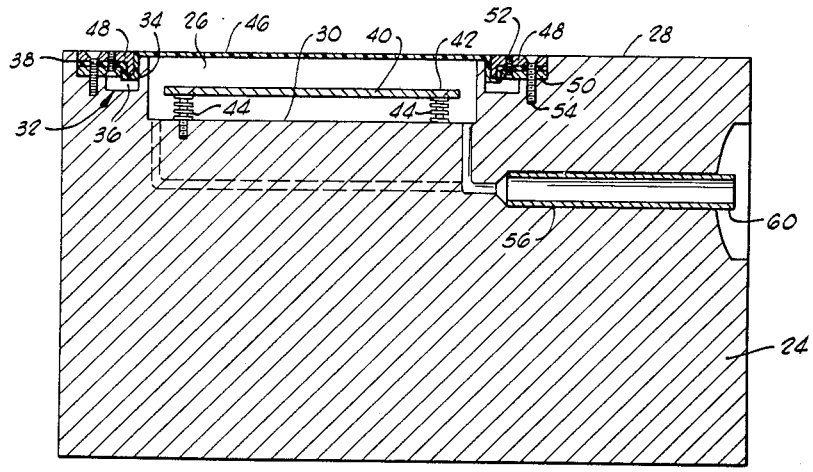
FIGURE 4 is a sectional view taken along line 4—4 of FIGURE 2.

Referring to FIGURE 2, the embodiment of the sample cell of the present invention there illustrated includes a housing 24 which is dimensioned to be received in one type of commercially available spectrometer now in widespread use. The housing 24 is provided with a chamber 26 formed in an inclined side 28 thereof. The chamber 26 in the illustrated embodiment is preferably rectangular in cross-section and is provided with a flat or substantially monoplanar bottom 30. Extending around the chamber in the manner best illustrated in FIGURE 4 is a channel 32 which is separated from the chamber 26 by an outwardly projecting flange 34. The channel 32 includes a relatively deep groove 36 adjacent the flange 34, and a relatively shallow groove 38 in juxtaposition to the groove 36.

Figure 3:
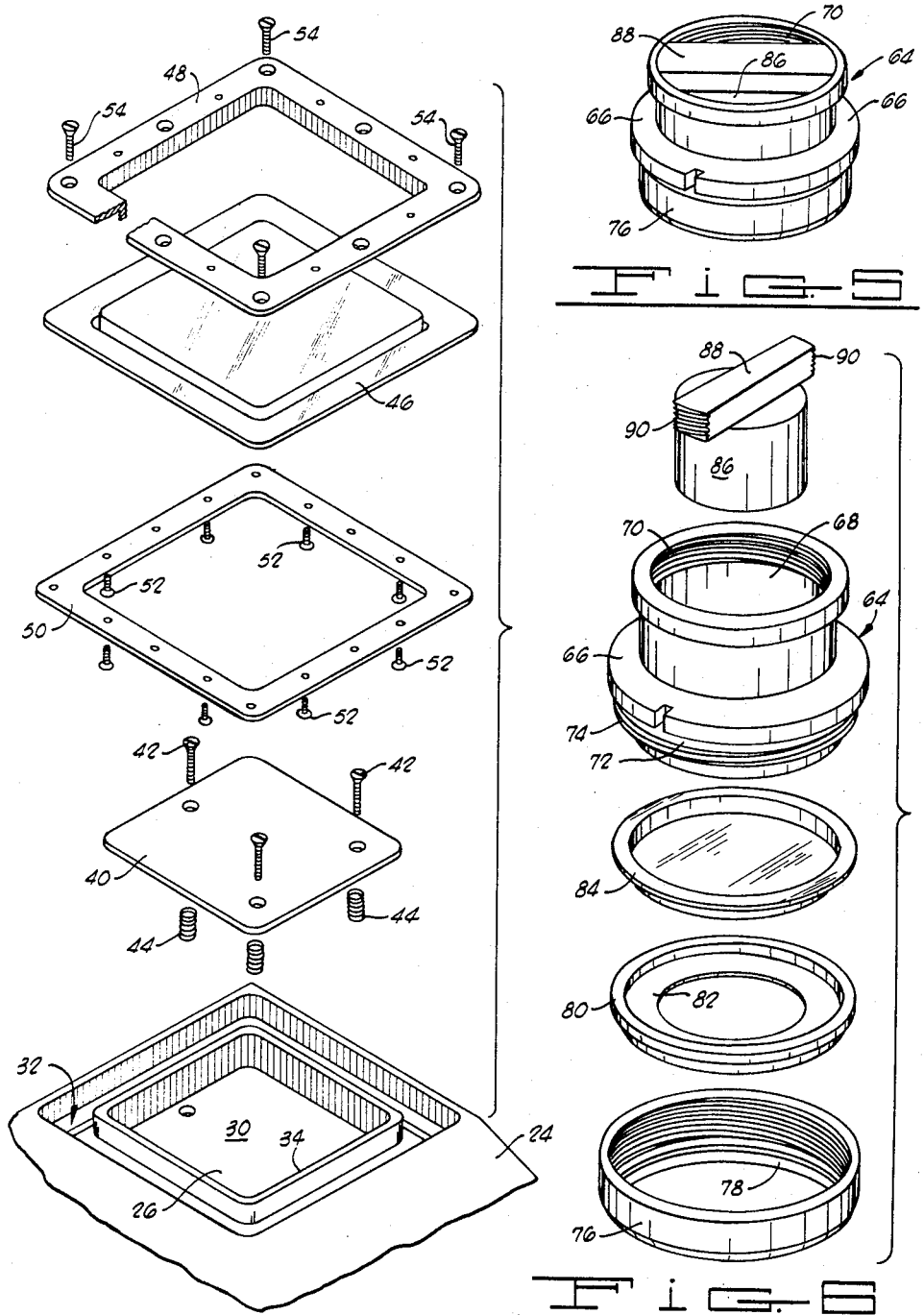
FIGURE 3 is an exploded view of a portion of the sample cell illustrated in FIGURE 2 and showing the manner in which the cell window and metallic secondary radiator are mounted in the cell.

The manner in which the metallic secondary radiator and the cell window are mounted in the housing 24 may be best understood by referring conjunctively to FIGURES 3 and 4 of the drawings. The metallic secondary radiator comprises a flat plate 40 which is mounted on the flat bottom 30 of the chamber 26 by a plurality of screws 42 which pass through resilient elements, such as helical springs 44, and into the bottom of the chamber. With this mounting arrangement, the metallic plate 40 can be adjusted in its spacing from the bottom 30 of the chamber 26, and also from the window of the cell as will be hereinafter described.

A cell window 46 is mounted in the housing 24 so as to form a closure for the chamber 26. The types of material utilized in constructing the window of the cell may vary considerably, the primary criterion being that the material remain, for a given set of instrumental conditions, constant in its absorption of X-rays from both the primary source and characteristic fluorescent X-rays from the metallic secondary radiator. Further than this, it is desirable that the cell window be constructed of a material containing elements of low atomic number, preferably lower than 9, such materials offering the least obstruction to the passage of X-rays as a result of absorption. Most preferably, a methyl methacrylate resin of the type sold under the trade name Mylar is used as the window material, since this resin can be formed in very thin, flexible sheets, is characterized by high tensile strength and contains only the elements carbon, hydrogen and oxygen (atomic number 8). Preferably, the thickness of the Mylar window does not exceed about 0.010 inch.

Where the cell window 46 is constructed of a thin flexible sheet of polymethyl methacrylate resin, the window can conveniently be secured in place by the mounting arrangement illustrated in FIGURES 3 and 4. The outer peripheral edges of the window 46 are stretched across the outwardly projecting flange 34 and sandwiched between a pair of plates 48 and 50 disposed in the channel 32. The upper plate 48 is preferably L-shaped in transverse cross-section to fit or interlock with the lower plate 50 and is secured thereto by a plurality of screws 52. Both plates are secured to the housing 24 by screws 54 which project downwardly therefrom into the housing. The cell window is thus secured tightly between the two plates and is stretched tautly across the chamber 26.

For the purpose of introducing a liquid sample to the chamber 26, a sample inlet port 56 and a sample outlet port 58 are provided which extend from the chamber 26 to one side of the housing 24. Suitable fittings 60 are provided in conjunction with the inlet and outlet ports 56 and 58, respectively, to permit sample conduits to be connected thereto. An internal passageway 62 is provided in the housing 24 and functions to admit a heat exchange fluid to the housing for the purpose of maintaining the liquid sample introduced to the sample cell at a constant temperature. The passageway 62 is connected to suitable conduits 64 external of the sample cell and leading to appropriate temperature control apparatus for permitting the temperature of the heat exchange fluid to be controlled as desired.

In utilizing the sample cell, the secondary radiator constituted by the metallic plate 40 is initially selected to give the desired type of characteristic fluorescent X-radiation upon impingement thereon of the primary X-radiation. Metals having a relatively high atomic number are, in general, most suitably used as the secondary radiator in the case of most liquid samples. Tungsten, titanium and chromium constitute preferred materials of construction of the metallic secondary radiator. Titanium is particularly desirable because of its chemical inertness. In any event, the particular metallic material selected for the construction of the secondary radiator is determined largely by the type of liquid sample which is to be subjected to analysis, and the criteria of selection are within the knowledge and understanding of those skilled in the art. In some instances, alloys may be used to a very good advantage to construct the metallic plate, as, for example, where a number of widely varying elements exist in the liquid specimen, and respond differently in their absorption characteristics.

The metallic plate 40 is adjustably mounted in the chamber 26 so as to provide the desired thickness of sample between the secondary radiator and the cell window 46 when the latter element is secured in position later in the assembly of the cell. The importance of the adjustability of the metallic plate 40 constituting the secondary radiator can be better understood by referring to the equation relationship between the path length and the intensity of the fluorescent radiation transmitted through the sample from the secondary radiator which is as follows:

$$I = I_0 e^{-[(\mu/\rho) \times \rho \times l]} \qquad (2)$$

where $I$ = the intensity of the attenuated radiation with the cell in place and the sample located therein
$I_0$ = the intensity of the unattenuated radiation occurring with the sample removed from the cell
$(\mu/\rho)$ = the mass-absorption coefficient of the liquid sample
$\rho$ = the density
$l$ = the thickness of the liquid sample through which the X-radiation from the secondary radiator must pass.

From the expressed relationship, it can be seen that the intensity of the portion of the characteristic radiation from the secondary radiator which is transmitted through the liquid sample is inversely exponentially related to the thickness of the sample which the fluorescent radiation must traverse. The ability to adjust the path length of the fluorescent radiation from the secondary radiator permits better control of matrix effects to be attained, and permits the intensity of the radiation coming from the sample to the analyzing crystal, and ultimately to the detecting and measuring apparatus, to be kept within an optimum range as dictated by the limits and capabilities of the particular detecting instrument utilized.

After adjusting the position of the metallic plate 40 constituting the secondary radiator, the conduits for delivering the liquid sample are connected to the cell, and the chamber 46 is filled with the sample. The temperature of the cell is adjusted so as to fix the density of the liquid sample at a known value.

The liquid sample and metallic plate 40 are then subjected to impingement by primary X-radiation from the X-ray tube of the spectrometer. The primary radiation passes through the liquid sample, strikes the metallic secondary radiator and causes it to emit characteristic fluorescent X-radiation. This radiation then passes through the liquid sample and is attenuated by absorption to a degree which is dependent upon the radiation path length through the liquid, the density of the liquid and the mass-absorption coefficient of the liquid in accordance with Equation 2 hereinbefore set forth. The mass-absorption coefficient of the liquid is, in turn, dependent upon the elements which are present in the liquid, and the weight fraction of each of such elements in the liquid. The attenuated beam is intercepted by a wavelength selection device, such as an analyzing crystal, which diffracts radiation of different wavelengths at different angles. It should be noted at this point that, if desired, a collimator (not shown in the drawings) may be inserted between the sample and the analyzing crystal for the purpose of screening undesirable radiation in accordance with techniques well known in the art.

A detecting and measuring or counting system is disposed relative to the analyzing crystal so as to pick up or receive specific monochromatic radiation which is diffracted by the crystal and which is characteristic of the metallic secondary radiator. Detectors in common usage for X-ray spectrochemical analysis are the Geiger, proportional and scintillation counters. Preferably, a flow proportional counter is employed. The counts registered by the device provide an indication of the intensity of the attenuated beam of characteristic fluorescent radiation from the secondary radiator after it has passed through the liquid sample. The values of intensity thus obtained are utilized conjunctively with a predetermined value for the mass-absorption coefficient characteristic of a system containing known amounts of the elements under analysis in the unknown sample. All that is required is that the element under consideration be calibrated once in a sample of known mass-absorption coefficient in order to correct for instrumental parameters. The element can then be run in any other material of known mass-absorption coefficient and the analytical results can be calculated as will be hereinafter explained in greater detail by a specific example of the practice of the invention.

The discussion of the procedure employed in the present invention has thus far been directed to liquid sample analyses in which characteristic fluorescent radiation emanating from the secondary radiator is passed through the liquid sample and is attenuated thereby. It should be pointed out that without removing the sample cell from the spectrometer, and without altering in any way the liquid sample contained therein, the sample may be subjected to further or veryifying analysis by the direct fluorescence technique involving no absorption phenomena other than those due to the inherent matrix effects in the liquid itself. In other words, the liquid sample, in being subjected to the direct impingement thereon of the primary X-radiation from the X-ray tube source, will emit its own characteristic fluorescent radiation, and this may be measured in lieu of the characteristic fluorescent radiation from the metallic secondary radiator by adjusting the angle of the analyzing crystal of the spectrometer so as to diffract to the detector only the fluorescent radiation which is characteristic of, and originates in, the liquid sample. This procedure affords, in the case of many elements having an atomic number of at least 12, an opportunity for checking the analysis obtained by back reflection from the secondary radiator and absorption by the liquid. A particularly valuable analysis which may be carried out using the dual fluorescence and absorption technique described is that in which sulfur-containing hydrocarbon streams are initially analyzed by the absorption procedure for purposes of evaluating the carbon and hydrogen content thereof, and then are evaluated by direct fluorescence of the sample to determine the sulfur content of the liquid.

Figure 7:
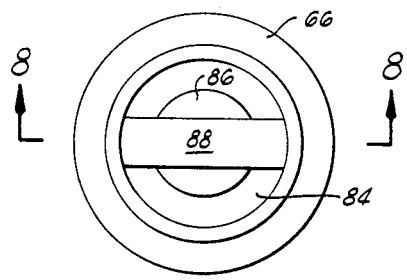
FIGURE 7 is a plan view of the sample cell illustrated in FIGURE 5.
Figure 8:
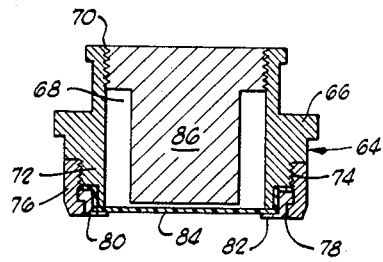
FIGURE 8 is a sectional view taken along line 8—8 of FIGURE 7.

A modified embodiment of the novel sample cell of the invention is illustrated in FIGURES 6, 7 and 8. This cell is adapted for use in a second type of spectrometer which, along with the spectrometer accommodating the cell shown in FIGURES 1 through 4, constitute the two types of X-ray spectrometer currently most widely used in industry. Construction of the cell may best be perceived in referring to FIGURES 6 and 8. The cell includes a generally cylindrical housing 64 which is provided with a notched circumferential flange 66 to permit the cell to be located in the correct position within the spectrometer. The cylindrical housing 64 is provided with a cylindrical bore 68 extending therethrough which is provided at one of its ends with internal circumferential threads 70. Intermediate its length, the housing 64 is provided with an annular shoulder 72 which carries circumferential external threads 74 which facilitate the securement to the housing of a locking nut 76. The locking nut 76 has a radially inwardly extending annular flange 78 thereon which functions in the assembled cell to engage a stretching washer 80 which is configured to frictionally surround the lower end of the housing 64 and abut the shoulder 72 formed thereon. The stretching washer 80 is provided with an inwardly extending annular flange 82 which abuts the end of the housing 64.

The window 84 of the cell is preferably a thin sheet of polymethyl methacrylate synthetic resin which is pressed into position across the end of the cell to close the bore 68 therethrough. Positioning of the window 84 is accomplished by pressing the stretch washer 80 downwardly around the end of the housing 64 with the polymethyl methacrylate window entrapped therebetween, and then threadedly securing the locking nut 76 to the housing 64. In this way, the window is stretched tautly across the bore 68 at one end of the cell.

The metallic secondary radiator used in the sample cell illustrated in FIGURES 5 through 8 comprises a cylindrical plug 86 which is provided at one end thereof with a diametrically extending bar 88. The bar 88 has arcuate end surfaces provided with threads 90 adapted to engage the internal circumferential threads 70 on the housing 64. The plug 86 is screwed downwardly in the housing 84 by rotating the bar 88 until the lower face of the plug is spaced the desired distance from the window 84. The plug 86 is constructed at least in part of the metal which is selected to constitute the secondary radiator as hereinbefore described.

It will be noted in referring to FIGURE 8 that the diameter of the plug 86 is substantially smaller than the diameter of the cylindrical bore 68 through the housing 64. It is thus possible to introduce the liquid sample to the top of the cell where it by-passes the bar 88 and passes downwardly around the plug 86 and fills the space between the lower end surface of the plug and the window 84. The cell is then inserted into the spectrometer and the analysis carried out as hereinbefore described.

The invention is further explained and its use clarified by the following examples of analyses carried out using the sample cell and procedure of the invention as hereinbefore described.

Example 1

A General Electric XRD-3 spectrometer modified for fluoresence measurements was used with the sample cell of the present invention and utilizing the method herein described. A chromium target X-ray tube was employed utilizing a tube power of 40 kilovolts at 15 milliamperes. A sodium chloride analyzing crystal was set to diffract characteristic fluorescent radiation from a secondary radiator at an angle of 58.34°. A flow proportionnal counter was employed with a power supply of 1.96 kilovolts, and the counter was set to provide two 100-second counts.

The metallic secondary radiator was a titanium plate and the cell window was a thin MYLAR sheet. The sample cell was kept at a constant temperature by passing water from a constant temperature bath through the heat exchange medium passageway in the cell housing. The temperature of the cell was constantly monitored with a Model 8690 Leeds & Northrup potentiometer. The temperature of the water was controlled with a solid-state temperature controller.

Figure 9:
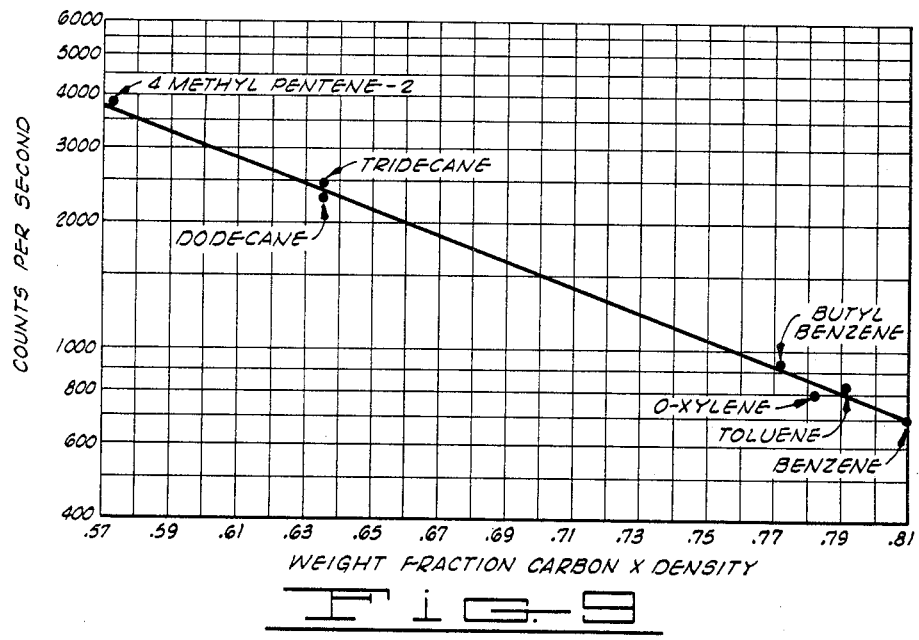
FIGURES 9, 10 and 11 are graphs showing curves obtained in the X-ray analysis of various liquids for various elements and compounds contained therein and utilizing the present invention in the analysis.

Utilizing the apparatus and operating conditions described, a series of analytical grade pure hydrocarbons were subjected to analysis. FIGURE 9 of the drawings shows the graph obtained by plotting the count rate obtained versus the weight fraction of carbon found in the several hydrocarbons multiplied by the density of the respective hydrocarbons. A least-squares calculation showed the analysis to be accurate to within ±0.15 percent.

The slope of the curve in FIGURE 9 gives the difference in the mass-absorption coefficients of carbon and hydrogen. It is important to know this constant so that the percentage of the various elements in materials having known mass-absorption coefficients can be determined without having to calibrate the instrument for each analysis. In other words, all that is required is that the element which is to be determined be calibrated once in a material of known mass-absorption coefficient to correct for instrumental parameters. The element can then be run in any other material of known mass-absorption coefficient and the results can be calculated.

The mass-absorption coefficient may be determined from the curve in the following manner. Rewriting Equation 2 gives $$\log I = (\mu/\rho)\rho l + \log I_0 \qquad (3)$$

The mass-absorption coefficient for a hydrocarbon is given by the sum of the mass-absorption coefficient of the individual elements, i.e., hydrogen and carbon, each multiplied by their weight fraction. Thus, $$(\mu/\rho) \text{ hydrocarbon} = (\mu/\rho)_C W_C + (\mu/\rho)_H W_H \qquad (4)$$

Substituting Equation 4 into Equation 3 gives $$\log I = -\rho l[(\mu/\rho)_C W_C + (\mu/\rho)_H W_H] + \log I_0 \qquad (5)$$

Substituting in Equation 5 the relation $W_H = 1 - W_C$ gives $$\log I = -\rho W_C l[(\mu/\rho)_C - (\mu/\rho)H] - \rho l(\mu/\rho)_H + \log I_0 \qquad (6)$$

The slope of the curve in FIGURE 9 is 3.2 and the cell thickness was found to be 0.117. Therefore, $$3.2/0.117 = 26.6 = (\mu/\rho)_C - (\mu/\rho)_H \qquad (7)$$

The term "$-\rho l(\mu/\rho)_H$" is small (less than 0.7) so it can be neglected. The mass-absorption coefficients given by the literature for hydrogen and carbon are 0.66 for hydrogen and 26.0 for carbon. The difference is therefore 25.34 which agrees fairly well with the value calculated from Equation 7.

Example 2

Figure 10:
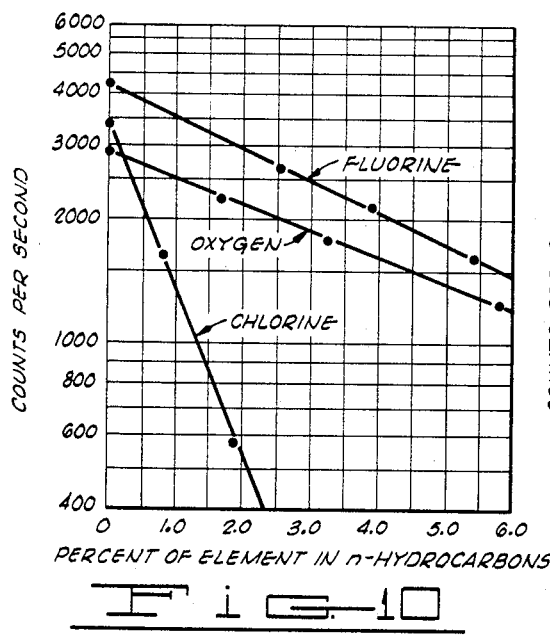

FIGURE 10 shows curves obtained for oxygen, fluorine and chlorine in hydrocarbon solvents. A different hydrocarbon material was used in each case which accounts for the fact that the zero percentage intercepts of the elements yielded different count rates. In other words, the hydrocarbon solvents used were matched with the compound containing the element of interest. For example, fluorine standards were made by incorporating varying amounts of fluorohexane in a hexane solvent and the chlorine standards were made by mixing varying amounts of chloroheptane with heptane. No other X-ray method is known to the applicants for determining oxygen and fluorine in liquids.

The plot of the percent chlorine versus count rate is given in FIGURE 10 mainly for comparison with the oxygen and fluorine lines. From the slopes of the curves, it can be seen that chlorine has a much larger mass-absorption coefficient than either fluorine or oxygen. The high mass-absorption coefficient of the element chlorine means that it has a high fluorescence yield and can therefore be determined more accurately by direct X-ray fluorescence methods. It would therefore be more desirable, for example, in a hydrocarbon containing a chlorine compound to initially make the analysis for percent carbon and hydrogen by the back reflection technique in which the characteristic fluorescent radiation from the secondary radiator was first measured after attenuation by passage through the liquid sample, and then determine the chlorine concentration by direct fluorescent measurements involving measuring the intensity of the characteristic fluorescent radiation emanating from the liquid sample upon direct impingement by the primary radiation.

Example 3

Figure 11:
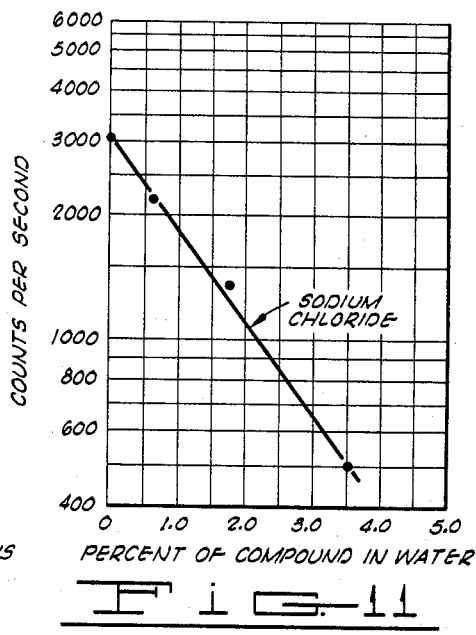

FIGURE 11 depicts a curve for the absorption of characteristic fluorescent radiation from the secondary radiator (titanium) due to the presence of sodium chloride in water. From the slope of this curve, it can be shown that the method carried out in accordance with the present invention utilizing fluorescent radiation from the secondary radiator is more sensitive than the direct fluorescence method heretofore sometimes utilized. This greater sensitivity is the result of the presence of oxygen in the water solvent, which element has a high mass-absorption coefficient for the characteristic fluorescent radiation of chlorine and absorbs the predominance of the fluorescence yield from the chlorine when the latter element is subjected to direct radiation. With the adjustable metallic plate included in the sample cell of the invention functioning as a secondary radiator, the initial count rate can be adjusted to any desired level by adjusting the path length of the cell, and the method permits advantage to be taken of the fact that both sodium and chlorine contribute significantly to the absorption of the characteristic fluorescent radiation from the titanium secondary radiator.

From the foregoing description of the invention, it will have become apparent that the present invention provides an improved method for carrying out X-ray spectrochemical analyses. The method is particularly useful when applied to liquid samples which contain elements having an atomic number of at least 4 and less than about 12. The cell permits considerable versatility in its use, however, in that by a simple and quickly effected adjustment in the angular setting of the analyzing crystal and detecting and measuring apparatus, direct fluorescence measurements may be made on the liquid sample in accordance with heretofore known techniques without removing the sample from the cell or the cell from the spectrometer.

Although certain exemplary embodiments have been disclosed herein by way of illustration of the invention, and in order to provide adequate directions to one desiring to use the principles underlying the invention, it is to be understood that the depicted and described apparatus may be modified in many respects without loss of ability to perform the functions requisite to the successful practice of the invention. All such modifications and innovations which may be made in the apparatus or in the method herein described, and which do not depart from the basic principles of the invention, are therefore deemed to be circumscribed by the spirit and scope of the invention except as the same may be necessarily limited by the appended claims or reasonable equivalents thereof.

We claim:

1. Apparatus for determining the composition of a liquid comprising:
   a primary source of X-radiation;
   a sample cell positioned to intercept a portion of the X-radiation from said primary source and including:
   a housing having a chamber with a substantially monoplanar bottom therein with a channel extending around said chamber and with a flange separating said chamber and said channel;
   a window transparent to a major portion of said X-radiation from said primary source and absorbing a constant amount of said X-radiation from said primary source with said window disposed over the flange of said housing;
   a pair of plates having said window sandwiched therebetween with said plates disposed in the channel of said housing so that said window is secured tightly between said plates and is stretched tautly across the chamber of said housing;
   a metallic secondary X-radiation radiator located in said chamber and adjustably spaced from said window by a plurality of screws which adjustably connect said radiator to the bottom of said chamber;
   means for confining a liquid sample between said metallic secondary radiator and said window;
   means for detecting and measuring the intensity of X-radiation quantum with said means positioned in optical alignment with said X-radiation radiator; and
   wavelength selection means interposed between said detecting and measuring means and said window for intercepting X-radiation passing from a liquid sample confined between said window and secondary radiator and transmitting X-radiation of a specific wavelength selected from the intercepted X-radiation to said detecting and measuring means.

2. Apparatus as claimed in claim 1 wherein said window is constructed of polymethyl methacrylate synthetic resin.

3. Apparatus as claimed in claim 1 wherein said metallic secondary radiator is constructed of titanium metal.

4. Apparatus as claimed in claim 1 wherein said wavelength selection means comprises:
   an alkali metal halide analyzing crystal; and
   a goniometer adjustably supporting said crystal in the path of said X-radiation passing from the liquid sample for changing the angle at which X-radiation is diffracted by said crystal.

5. Apparatus as claimed in claim 1 and further characterized to include means for maintaining said sample cell at a constant, preselected temperature.

References Cited

UNITED STATES PATENTS 2,791,698   5/1957   Dyroff et al. _____ 250—43.5
3,354,308   11/1967  Engel et al. _____ 250—51.5

WILLIAM F. LINDQUIST, *Primary Examiner.*